United States Patent [19]

Takahashi et al.

[11] Patent Number: 4,942,414
[45] Date of Patent: Jul. 17, 1990

[54] FRONT CONVERSION ADAPTER FOR LENS SHUTTER TYPE OF ZOOM LENS CAMERA

[75] Inventors: Norimichi Takahashi; Hitoshi Tanaka; Koichi Maruyama, all of Tokyo, Japan

[73] Assignee: Asahi Kogaku Kogyo Kabushiki Kaisha, Tokyo, Japan

[21] Appl. No.: 244,789

[22] Filed: Sep. 15, 1988

[30] Foreign Application Priority Data

Sep. 17, 1987 [JP] Japan .................. 62-233330

[51] Int. Cl.$^5$ .............................................. G03B 13/32
[52] U.S. Cl. ................... 354/195.12; 354/400; 354/199; 354/295
[58] Field of Search ............... 354/195.1, 195.12, 199, 354/163, 164, 222, 223, 295, 286

[56] References Cited

U.S. PATENT DOCUMENTS

| | | | |
|---|---|---|---|
| 3,194,139 | 7/1965 | Babcock | 354/199 |
| 3,260,184 | 7/1966 | Pagel et al. | 354/199 |
| 3,836,934 | 9/1974 | Suzuki et al. | 354/195.12 |
| 4,219,264 | 8/1980 | Rodeck | 354/295 |
| 4,490,031 | 12/1984 | Mineshima | 354/295 |
| 4,728,973 | 3/1988 | Taniguchi et al. | 354/286 |

FOREIGN PATENT DOCUMENTS

| | | |
|---|---|---|
| 59-147129 | 1/1984 | Japan . |
| 0118733 | 6/1986 | Japan .................. 354/295 |
| 62-91630 | 11/1987 | Japan . |

OTHER PUBLICATIONS

"One-Piece, One-Touch!", Japan Camera Trade News, p. 16, May 85.

Primary Examiner—Russell E. Adams
Attorney, Agent, or Firm—Sandler, Greenblum and Bernstein

[57] ABSTRACT

A front conversion adapter which can be attached to the front face of a lens shutter type of camera having a zoom lens and a finder optical system, wherein a lens frame of the zoom lens moves in accordance with the zooming operation. The front conversion adapter has an adapter body which can be attached to a camera body, and a conversion optical system which is located in front of the zoom lens and which moves in the optical axis direction thereof to change the focal length of the zoom lens. The conversion optical system is supported by an adapter lens frame so as to move in the optical axis direction in association with movement of the lens frame of the zoom lens and in accordance with zooming operation.

18 Claims, 16 Drawing Sheets

FRONT CONVERSION ADAPTER FOR LENS SHUTTER TYPE OF ZOOM LENS CAMERA

BACKGROUND OF THE INVENTION

1. Field of the Invention

The present invention relates to a front conversion adapter which is attached to a front face of a lens shutter type of camera having a zoom lens.

2. Description of Related Art

The assignee of the present application has proposed a lens shutter type of auto-focus camera having a zoom lens, for example, in U.S. patent application Ser. No. 144,030 (PCT/JP87/00293) filed on January 7, 1987, which is still pending. The products which are the subject of the U.S. application are available on the market. In the lens shutter type camera disclosed in the above-mentioned U.S. application, the finder field of view of the finder optical system and the illumination angle of the strobe device vary in accordance with the magnification of the photographing optical system. Namely, a lens shutter type of camera which is smaller and lighter than a single lens reflex camera but comparable thereto in function has been realized by the device disclosed above-mentioned pending U.S. application.

The improvement of the present application is mainly directed to the lens shutter type of auto-focus camera as disclosed in U.S. Ser. No. 144,030 mentioned above.

In the lens shutter type of camera having a zoom lens, as mentioned above, the photographing range of the camera is, of course, restricted by the magnification of the photographing optical system. The inventors of the present application have found that the inherent magnification (variable power) of the zoom lens can be changed by the use of a simple adapter.

SUMMARY OF THE INVENTION

The primary object of the present invention is to provide a front conversion adapter which can be attached to a lens shutter type of camera having a zoom lens to vary the magnification (photographing range) of the photographing optical system.

Another object of the present invention is to provide a device which can correct a drive signal which is supplied from an object distance measuring device to a driving system of a focusing lens at the moment of a shift of the variable power area of the photographing optical system, in accordance with the shift of the focal length by a conversion lens system.

Still another object of the present invention is to provide a front conversion adapter which can adjust the finder field of view of a finder optical system in accordance with change of the variable power range of the photographing optical system.

Still another object of the present invention is to provide a front conversion adapter which can adjust the illumination angle of a strobe device in accordance with changes of the variable power range of the photographing optical system.

The adapter of the present invention can be detachably attached to a front face of a lens shutter type of camera having a photographing optical system composed of a zoom lens and a finder optical system composed of an optical system separate from the photographing optical system, wherein a lens frame of the photographing optical system moves in accordance with the zooming operation.

According to the present invention, there is provided a front conversion adapter comprising an adapter body which can be detachably attached to an associated camera body, a conversion optical system which is movably supported by the adapter body to move in front of the photographing optical system to change the focal length thereof. The conversion optical system is supported by a conversion lens frame adapted to move in the optical axis direction in association with movement of the lens frame of the photographing optical system of the camera body. The lens frame of the photographing optical system and the lens frame of the conversion optical system are connected to each other, for example, by a permanent magnet. The conversion optical system is continuously biased toward the camera body, so that when the conversion lens frame comes into abutment with the photographing optical system, both of the lens frames move together.

Preferably, the front conversion adapter has a finder correcting lens which has a magnification identical to the angular magnification of the conversion optical system, and is located in front of the finder optical system. The finder correcting lens can vary the magnification of the finder optical system in accordance with the angular magnification of the conversion optical system, so that the photographing range when the adapter is attached to the camera body is identical to the finder field of view.

The object distance measuring device which supplies an automatic focusing drive signal to the focusing lens of the photographing optical system can be associated with the conversion lens system by two different means. According to one of the means, magnification of the conversion lens is given to a control device of a stepping motor for driving the focusing lens to provide different displacements of the focusing lens, depending on the attachment and detachment of the front conversion adapter to and from the camera body. With this arrangement, no correcting means is necessary on the object distance measuring device.

The other means is realized by an object distance correcting prism which is located in front of a light receiver of the object distance measuring device to correct the light path of the object distance measuring device in accordance with the magnification of the conversion adapter. With this arrangement, no correction of the control device of the stepping motor is necessary.

BRIEF DESCRIPTION OF DRAWINGS

The invention will be described below in detail with reference to the accompanying drawings, in which:

FIGS. 11 to 32 show a lens shutter type of camera having a zooming function, to which the present invention can be advantageously applied, of which:

FIG. 11 is a schematic perspective view of the main components of a lens shutter type of camera;

FIG. 12 is a front elevational view of a lens barrel block, a light emitter, a light receiver and a close distance correcting optical element, of an object distance measuring device, and a zoom motor, of the camera shown in FIG. 11;

FIG. 13 is a plan view of FIG. 12;

FIGS. 14 and 15 are sectional views taken along lines XIV—XIV and XV—XV in FIG. 12;

FIG. 16 is a longitudinal sectional view of a lens barrel block;

FIG. 17 is a developed view of cam grooves of a cam ring on which front and rear groups of lenses ride;

FIG. 18 is an exploded perspective view of a lens barrel block;

FIG. 19 is a plan view of a cam plate of a finder block;

FIG. 20 is a sectional view taken along line XX—XX in FIG. 19;

FIG. 21 is a rear view of FIG. 19;

FIG. 22 is a plan view of FIG. 19 with a removed cam plate and a mether mother plate;

FIG. 23 is a front elevational view of FIG. 12;

FIG. 24 is a sectional view taken along line XXIV—XXIV in FIG. 23;

FIG. 25 is a sectional view similar to FIG. 24 but showing a different operational position;

FIG. 26 is a longitudinal sectional view similar to FIG. 25, with a removed refractive prism actuating plate and a refractive prism which is inserted;

FIG. 27 is a front elevational view similar to FIG. 23, but showing the insertion of the refractive prism;

FIG. 28 is a sectional view taken along; the line XXVIII—XXVIII in FIG. 27;

FIG. 29 is a schematic view of an object distance measuring device showing the principles of triangulation measurement;

FIG. 30 is a schematic view similar to FIG. 29, but shown in a position in which a close distance correcting optical element is inserted;

FIG. 31 is an enlarged view of the close distance correcting optical element shown in FIG. 30; and, FIG. 32 is a front elevational view of a close distance correcting optical element shown in FIG. 30.

DETAILED DESCRIPTION OF EMBODIMENTS

First, a lens shutter type of camera having a zoom lens, to which the present invention can be advantageously applied, will be explained below with reference to FIGS. 11 to 20.

Figure 11:
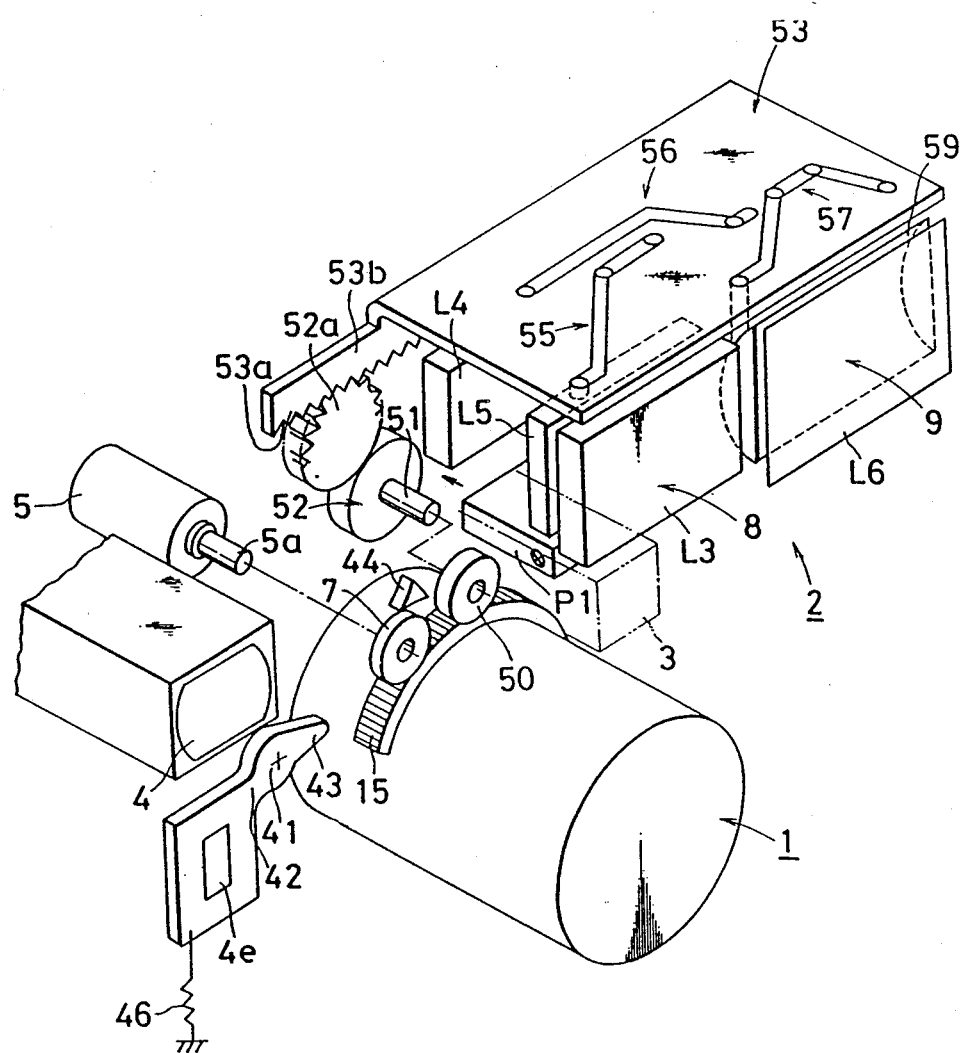
Figure 12:
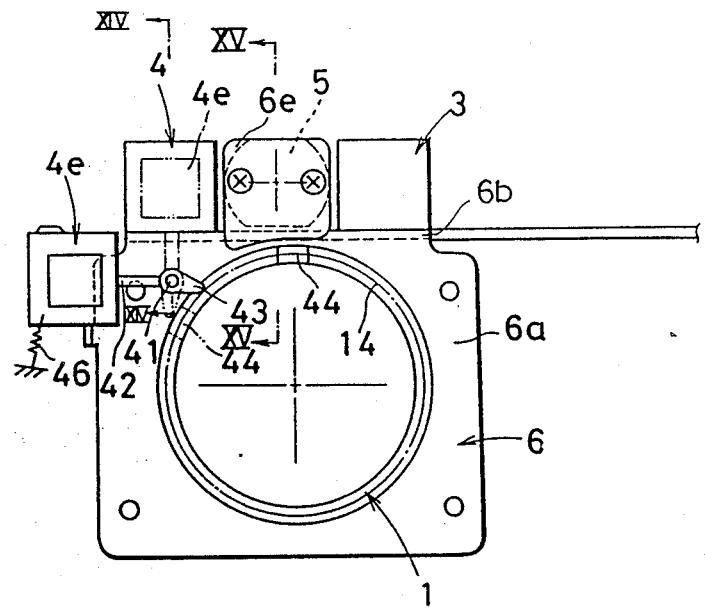
Figure 13:
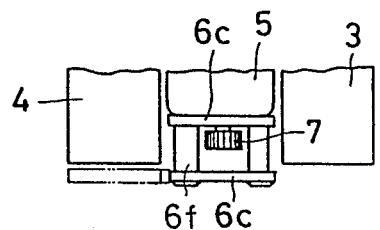
Figure 14:
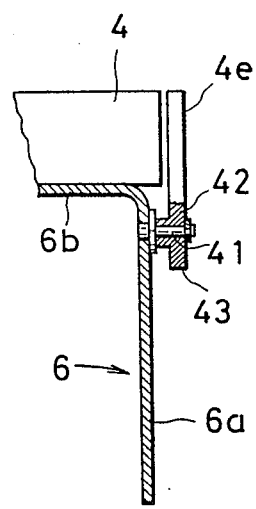
Figure 15:
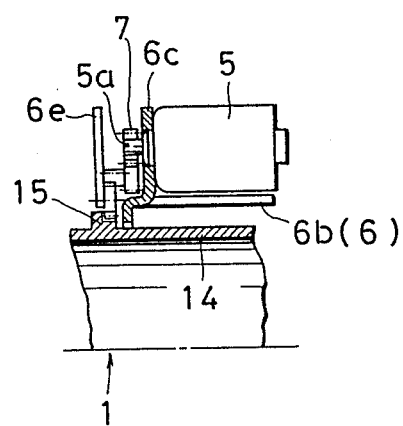

The lens shutter type of camera essentially has a lens barrel block 1 of a zoom lens, a finder and strobe block 2 (which will be referred to as a finder block), light emitter 3 and light receiver 4 of a distance measuring device (AF device), and a zooming motor 5 for zooming operation, as can be seen in FIG. 11. These elements are secured to a base 6 (FIGS. 12 to 14) which is an immovable part of a camera body.

The base 6 has a lens barrel supporting plate portion 6a lying in a plane perpendicular to an optical axis (light axis), a horizontal supporting plate portion 6b extending from the lens barrel supporting plate portion 6a at a right angle, and a motor supporting plate portion 6c perpendicular to the horizontal supporting plate portion 6b. The lens barrel block 1 is supported on the lens barrel supporting plate portion 6a. The motor supporting plate portion 6c is secured to the zooming motor 5 at a position located above the center portion of the lens barrel block 1. The light emitter 3 and the light receiver 4 which are secured to the horizontal supporting plate portion 6b are located on opposite sides of the zooming motor 5. The finder block 2 is secured to the right portion of the horizontal supporting plate portion 6b, as viewed from front. A gear train supporting plate 6e is connected to the motor supporting plate portion 6c through a spacer 6f.

The lens barrel block 1, which has a zooming function and a macro-photographing function, is actuated by the zooming motor 5. The construction of the lens barrel block 1 will be described below with reference to FIGS. 15 to 18.

A rear securing plate 11 is mounted to the lens barrel supporting plate portion 6a of the base 6 by means of fastening screws 10. The rear securing plate 11 has four guide rods 12 secured thereto which are located, around the optical axis, and which are parallel thereto. A front securing plate 13 is secured to the front ends of the guide rods 12. The elements mentioned above are main securing elements of the lens barrel block 1.

Figure 16:
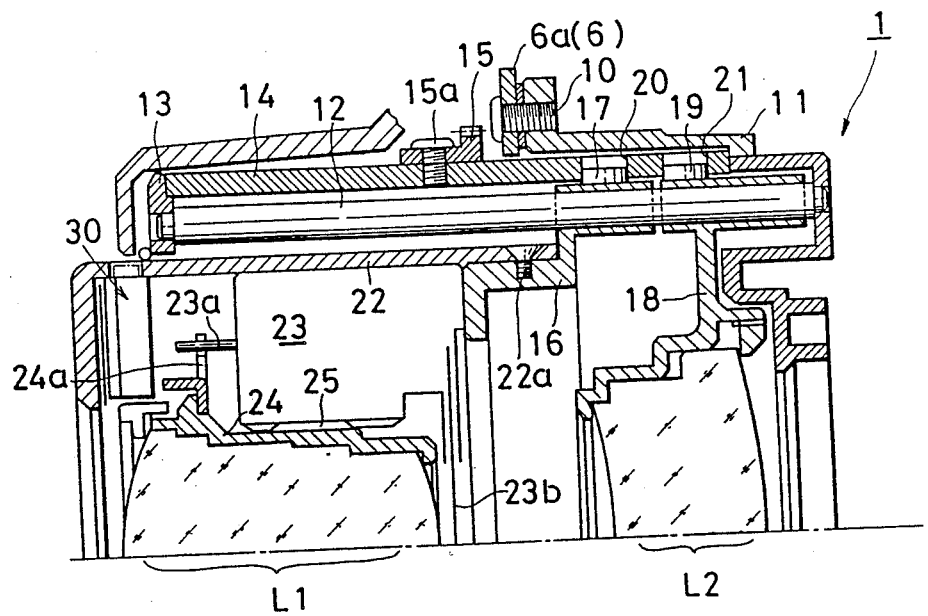

A rotatable cam ring 14 is provided between the front and rear securing plates 13 and 11 and is itself provided, on its outer periphery, with a gear 15 which is fixed thereto by means of set screws 15a (FIG. 16). Gear 15 is, directly or through a gear train, engaged by a pinion 7. Gear 15 is a sector gear which covers a range of rotational displacement of the cam ring 14. The cam ring 14 has zooming cam grooves 20 and 21 for receiving front and rear lens groups, respectively.

Figure 17:
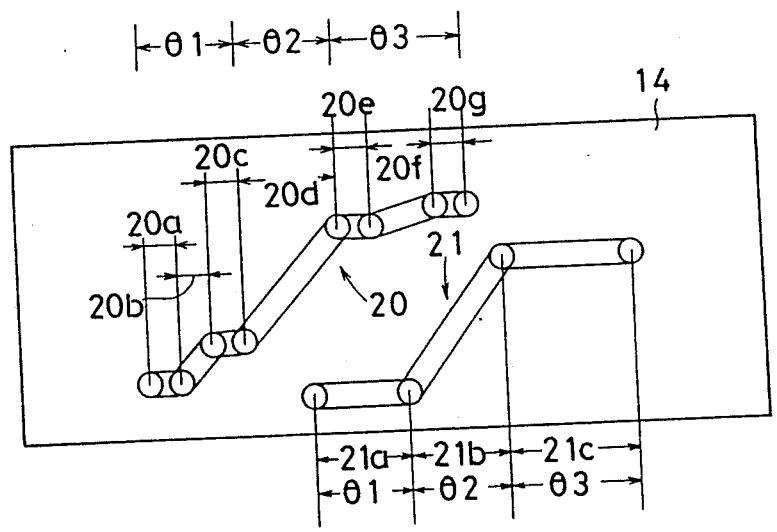
Figure 18:
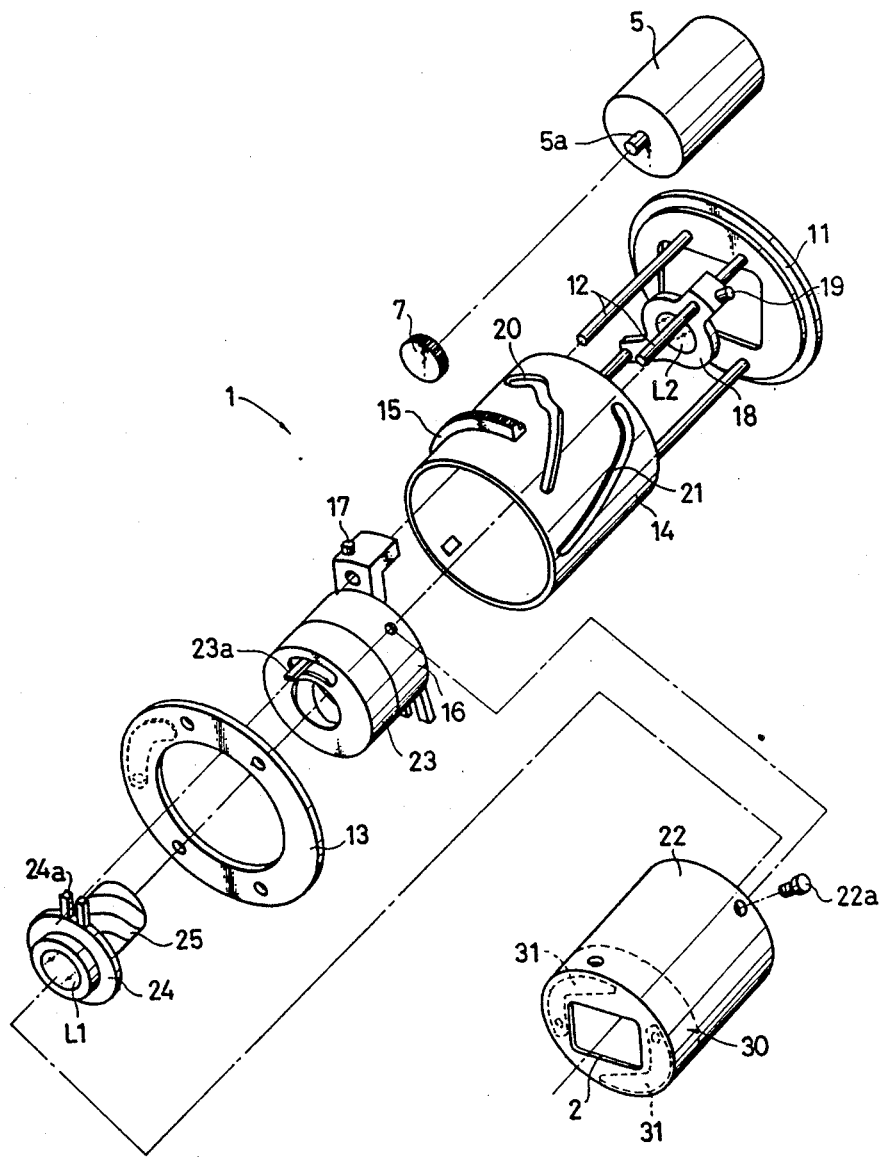

FIG. 17 shows developed zooming cam grooves 20 and 21. The cam groove 21 for the rear lens group has a wide angle extremity fixing section 21a, a variable magnification (power) section 21b, and a telephoto extremity fixing section 21c. On the other hand, the cam groove 20 for the front lens group has a section 20a for opening and closing the barrier block 30, a lens retracting section (lens accomodating section) 20b, a wide angle extremity fixing section 20c, a variable magnification (power) section 20d, a telephoto extremity fixing section 20e, a macro feeding section 20f, and a macro extremity fixing section 20d. The total angle $\theta 1$ of the rotational displacement of the opening and closing section 20a, the lens retracting section 20b, and the wide angle extremity fixing section 20c, of the zooming cam groove 20 is identical to the angle $\theta 1$ of the wide angle extremity fixing section 21a of the zooming cam groove 21, and the angle $\theta 2$ of the variable magnification (variable power) section 20d is identical to the angle $\theta 2$ of the variable magnification (variable power) section 21b. Further, the total angle $\theta 3$ of the telephoto extremity fixing section 20e, the macro extremity fixing section 20g, and the macro feeding section 20f, is equal to the angle $\theta 3$ of the telephoto extremity fixing section 21c.

In the zooming cam grooves 20 and 21 are fitted a roller 17 of a front group frame 16 and a roller 19 of a rear group frame 18, respectively. The front group frame 16 and the rear group frame 18 are movably guided by the guide rods 12. A lens frame 22 and a shutter block 23 are secured to the front group frame 16 by means of set screws 22a.

A front lens frame 24, which supports the front lens group L1, is engaged by the shutter block 23 by means of a helicoid 25. The front lens frame 24 has an arm 24a which comes into engagement with a lens feeding lever 23a of the shutter block 23, so that when the lens feeding lever 23a rotates in the circumferential direction to rotate the front lens frame 24, the front lens frame 24 moves in the optical axis direction with the help of the helicoid 25. The rear lens group L2 is directly secured to the rear group frame 18.

When the zoom motor 5 rotates, the front lens group L1 and the rear lens group L2, together with the lens frame 22 and the shutter block 23, move wholly in the optical axis direction along the zooming cam grooves 20 and 21, so that the lens frame 22 moves away from, and close to, the cylindrical decoration frame 110 of camera body 101.

The shutter block 23 rotates the lens feeding lever 23a by a predetermined angular displacement, in accordance with a detection signal received from the distance measuring device, by means of a pulse motor incorporated in the camera body to open the shutter (sector) 23b which has been closed for a predetermined time, and then returns the lens feeding lever 23a to its initial position after the shutter is closed again.

The gear 15 of the cam ring 14 is engaged by another pinion 50 different from the pinion 7. Shaft 51 of the pinion 50 extends toward the rear portion of the base 6 and is provided on its rear end, with a reduction gear train 52. The reduction gear train 52 has a terminal gear 52a which is in mesh with rack 53a of a cam plate 53. The cam plate 53 is slidable in the right and left hand directions (lateral directions) and has a downward bent portion 53b at its rear end. The rack 53a is formed on the lower end of the bent portion 53b of the cam plate 53. The reduction gear train 52 is adapted to reduce the rotation of the gear 15 in order to restrict the movement of the cam plate 53. The cam plate 53 is provided with variable power cam groove 55 for the finder device 8, a parallax correction cam groove 56, and a strobe cam groove 57 of strobe device 9.

The lens system of the finder device 8 is essentially composed of a subject lens group L3, an eye-piece lens group L4, and a movable variable power lens group L5, and also includes a deflection prism P1 for a macro mode.

Figure 26:
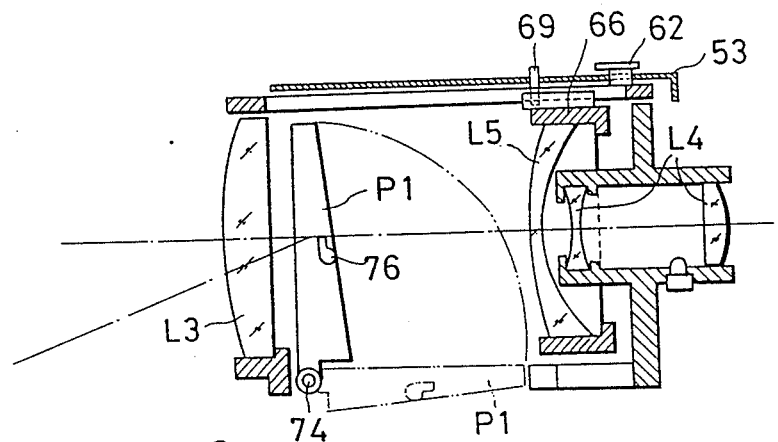

The variable power lens group L5 makes the image picture size, which varies in accordance with the variable power operation of the lens barrel block 1, coincident with the field of view by the finder device 8. The deflection prism P1 comes in the optical path of the lens system only in the macro mode, particularly to adjust the parallax. Namely, the parallax which is inevitable in the lens shutter type of camera becomes large as an object to be taken comes closer, and accordingly, a large parallax can be caused in the macro mode. To solve this problem of a large parallax in the macro mode, a deflection prism P1 is provided in the present invention, which is in the form of a wedge with a thicker lower end and a thinner upper end. The deflection prism P1, when located in the light path, deflects the rays downwardly to take a picture of the object closer to the camera. FIG. 26 shows a light path of rays when the deflection prism P1 is located in the optical axis of the camera.

The strobe device 9 restricts the illumination angle as the focal length of the photographing lens increases, namely as the lens is fed forward and increases the illumination angle at the macro mode to decrease the quantity of light to the object. In the illustrated embodiment, the strobe device 9 has a fixed Fresnel lens L6 and a movable concave reflector (reflecting shade) 59 with a xenon lamp 58 which can be moved in the optical axis direction.

The driving mechanism for actuating the finder device 8 and the strobe device 9 is shown in FIGS. 19 to 26.

Figure 19:
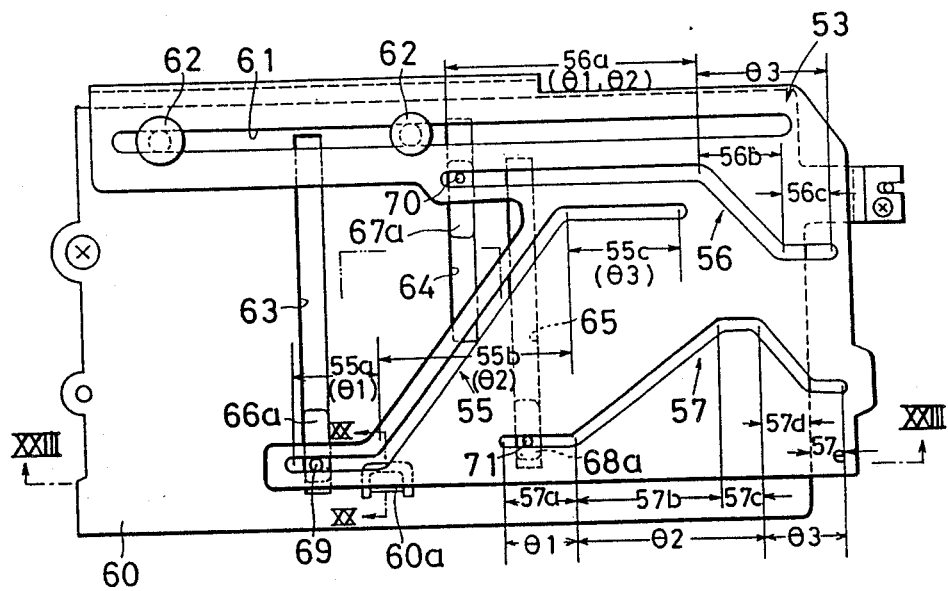
Figure 20:
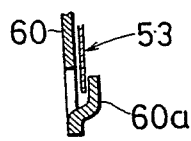
Figure 21:
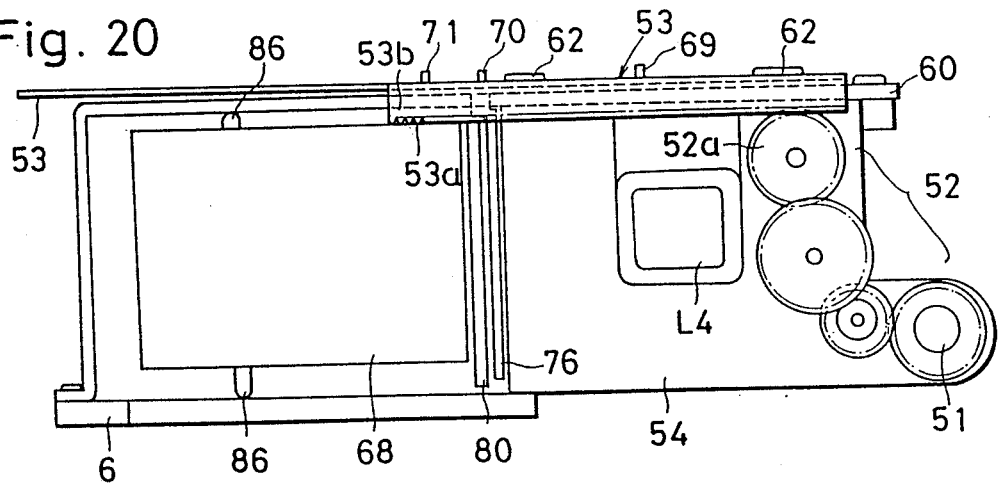
Figure 22:
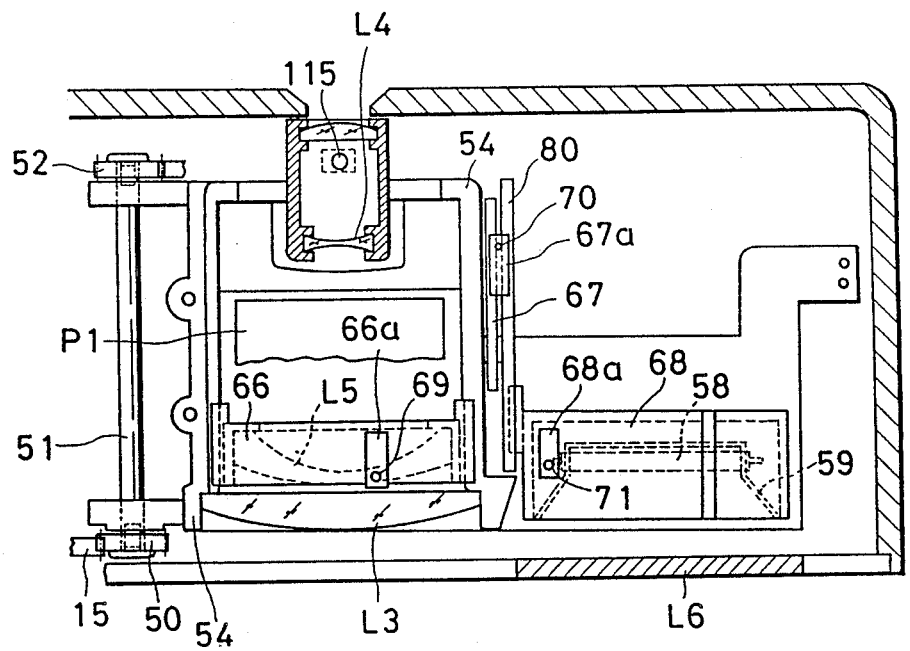
Figure 23:
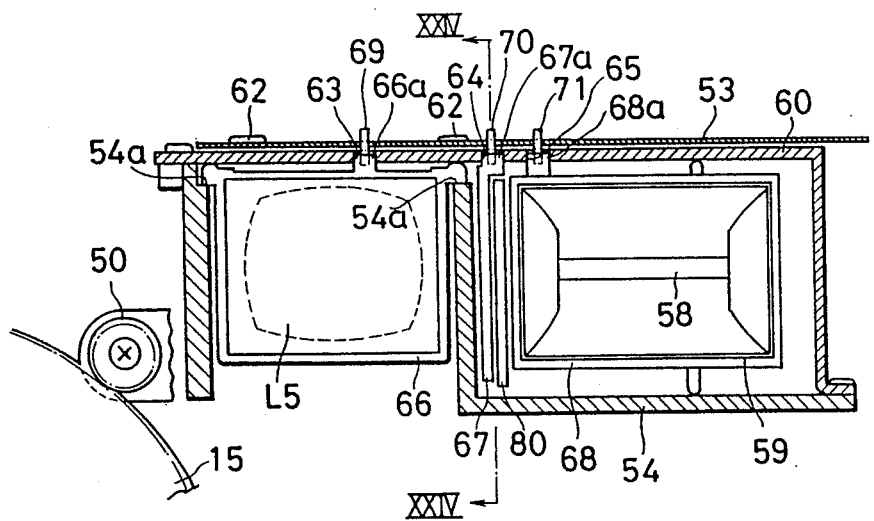

To a finder block 54 which is mounted to the base 6 is secured to a mother plate 60 which is provided with guide pins 62 integral therewith which are fitted in a linear guide groove 61 of a cam plate 53. Sliding movement of the cam plate 53 in the lateral direction with respect to the optical axis is restricted by the engagement of the guide groove 61 and the guide pins 62, and a guide projection 60a which is formed integrally with the finder mother plate 60 to prevent the cam plate 53 to from floating away from the mother plate 60 especially at the front end of the cam plate 53, as shown in FIGS. 19 and 20.

The finder mother plate 60 has a variable power lens guide groove 63, a deflection prism guide groove 64, and a strobe guide groove 65. These guide grooves all extend parallel to the optical axis. A guide projection 66a of a variable lens frame 66 which carries the variable power lens group L5 is fitted in the variable power lens guide groove 63 L5. In the deflection prism guide groove 64 a guide projection 67a of a deflection prism actuating plate 67 is fitted. A guide projection 68a of a strobe case 68, which has a concave reflector 59 secured thereto, is fitted in the strobe guide groove 65. The variable power lens frame 66, the deflection prism actuating plate 67 and the strobe case 68 move in directions parallel to the optical axis, along the respective guide grooves. The guide projections 66a, 67a and 68a are provided with driven pins 69, 70 and 71, which are fitted in the variable power cam groove 55, the parallax correcting cam groove 56 and the strobe cam groove 57, respectively. Accordingly, when the cam plate 53 moves laterally, the variable power lens frame 66, the prism actuating plate 67, and the strobe case 69 move along the respective cam grooves 55, 56 and 57. The sections of the variable power cam groove 55, the parallax compensating (correcting) cam groove 56 and the strobe cam groove 57 correspond to the sections of the zooming cam grooves 20 and 21 of the cam ring 14, which has been described hereinbefore with references to FIG. 17. Namely, the variable power cam groove 55 has a wide angle extremity fixing section, 55a, a variable power section 55b, and a telephoto extremity fixing section 55c; and the angles $\theta 1$, $\theta 2$, and $\theta 3$, of the three sections correspond to those in FIG. 17. The parallax compensating cam groove 56 has a non-projecting section 56a, a projecting movement section (forward feed section for macro mode) 56b, and a projected position fixing section (macro-extremity fixing section) 56c. The strobe cam groove 57 has a wide angle extremity fixing section 57a, a variable power section 57b, a telephoto-extremity fixing section 57c, a macro feeding section 57d, and a macro-extremity fixing section 57e.

Figure 24:
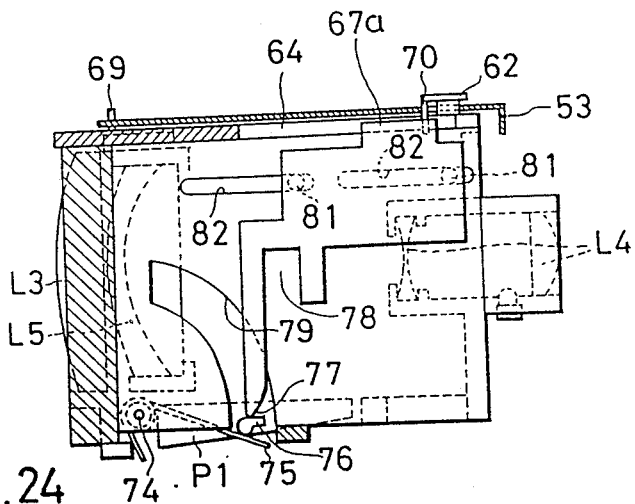
Figure 25:
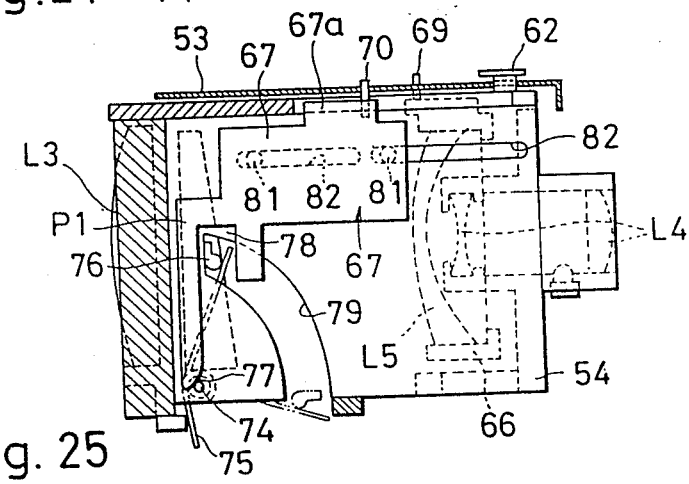

The prism P1 is actuated by a prism actuating plate 67, as shown in FIGS. 24 to 26.

The deflection prism P1, which is made of synthetic resin, is rotatably supported by the finder block 54 through lower opposite supporting pins 74 of the prism P1. The supporting pins 74 have torsion springs 75 surrounding them, one end of which bears against the respective abutments 76 provided on the side face of the deflection prism P1, so that the prism P1 is continuously biased towards a position in which the prism P1 comes into alignment with the optical axis of the lenses L3-L5. The abutments 76 are located in an archwise groove 79 formed in the finder block 54. The deflection prism actuating plate 67 is held between the finder block 54 and a guide plate 80 connected to the finder block 54, so that a guide pin 81 provided on the side face of the finder block 54 is fitted in a linear guide groove 82 of the finder block 54.

Figure 27:
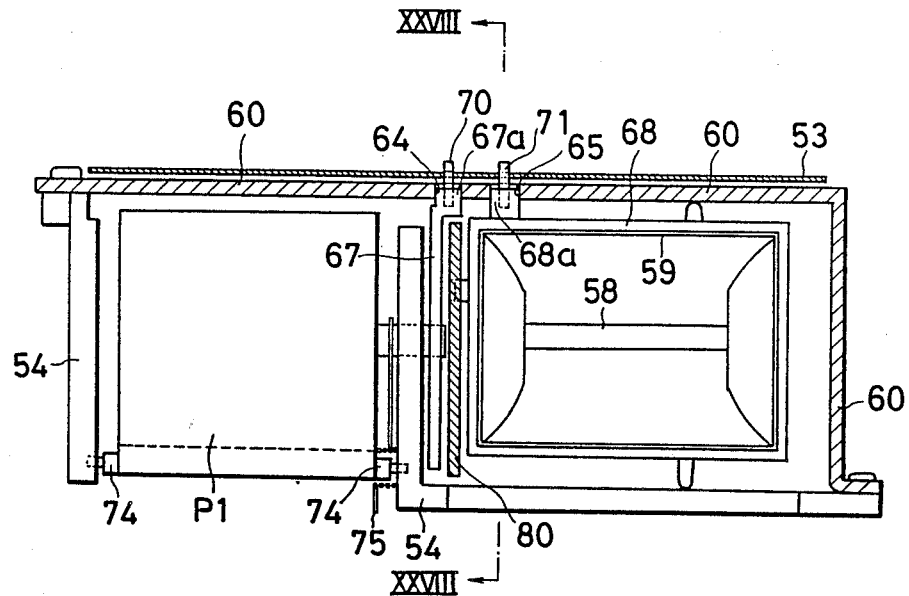
Figure 28:
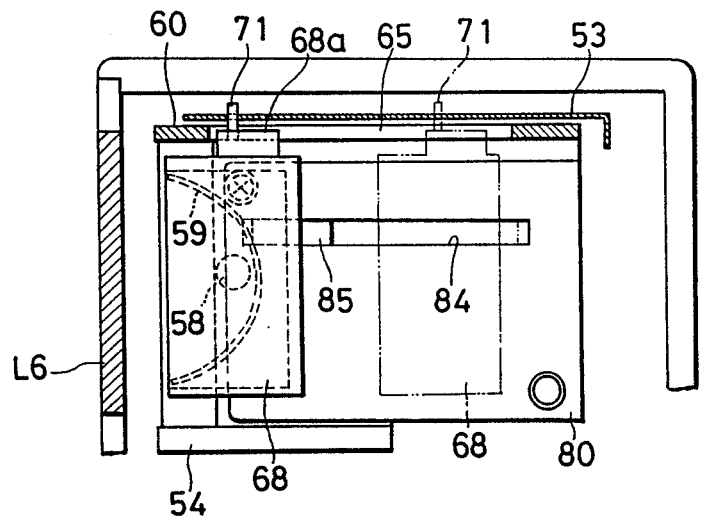

The position restricting abutments 76 can be engaged by rotation preventing face 77 and rotating face 78, of the prism actuating plate 67. The prism actuating plate 67 retracts prism P1 from the light path of the lenses L3-L5, against springs 75, when the pin 70 is in the non-projecting section 56a of parallax compensating cam groove 56, since the rotation preventing face 77 comes into engagement with abutments 76. When pin 70 comes into the projecting movement section 56b, rotating face 78 comes into abutment with abutments 76, so that the prism P1 rotates to come into alignment with the optical axis with the help of torsion springs 75. During this movement, abutments 76 moves on and along the rotating face 78, and the deflection prism P1 gradually comes in the optical path as shown in FIGS. 25 and 26, so that the light path of the finder is deflected downwardly as shown in FIG. 26, by the prism P1. As a result of this, a subject which is located below can come into the field of view. Thus, parallax in the macro mode can be decreased. On the side face of the strobe case 68, a guide block 85 is provided which is fitted in a linear guide groove 84 parallel to the optical axis of the camera formed in the guide plate 80, as shown in FIG. 28. Also, on the upper and lower faces of the strobe case 68 are provided height adjusting ribs 86 FIGS. 21 and 27) which prevent the strobe case from falling down. The strobe case 68 moves along the strobe cam groove 57 when the cam plate 53 moves in the lateral directions. The variable power section 57b of the strobe cam groove 57 is adapted to move the xenon lamp 58 rearwardly from Fresnel lens L6. This backward movement of the xenon lamp 58 causes the illumination angle of the light from the Fresnel lens L6 to decrease in order to substantially increase the guide number in accordance with an increase in the focal length. On the contrary, in the macro feeding section 57d, the illumination angle is increased, and the guide number is substantially decreased in the macro mode.

Figure 29:
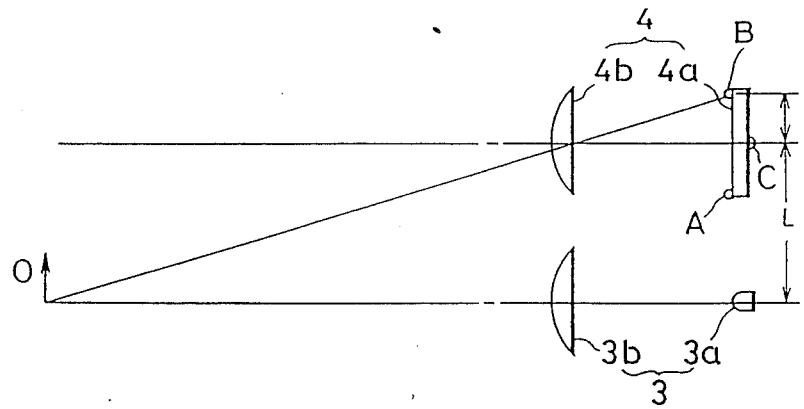

The distance measuring device (AF device) will be explained below with reference to FIGS. 29 to 32. There are various known distance measuring devices having a light emitter 3 and a light receiver 4. In the illustrated embodiment, the type of distance measuring device having, as a light receiver, a position detecting element (e.g., a PSD) which operates on the basis of the triangulation measuring principle, is used. FIG. 29 shows the concept of the measuring performed, in which the light emitter 3 has a light source 3a, such as an LED and light emitting lens 3b, and the light receiver 4 has a PSD 4a which is spaced at a distance corresponding to the base length L from the light source 3a and a light receiving lens 4b. Contrary to a CCD which has a number of light receiving elements, the PSD 4a is formed with an elongated single light receiving element, as is well known, having a single common terminal (cathode) C and two terminals (anodes) A and B of different polarity from the common terminal C.

In the distance measuring device, when light is emitted from the light emitter 3a so that the light reflected from the object O to be photographed is incident upon the PSD 4a, the light receiving point of the light receiving surface thereof depends on the distance of the object O. As a result, the light electrical current is produced from the terminals A and B, in accordance with the light receiving point. The object distance can be detected by measuring the electrical current produced. The foregoing is a description of the triangulation measuring principle involving the use of a PSD 4a.

In accordance with the distance data thus obtained, actuation signals are supplied to the shutter unit 23 to effect automatic focusing in the entire zooming range. Namely, when drive pulses are supplied to the pulse motor of the shutter unit 23 in accordance with the measured distance data, lens feeding lever 23a rotates over an angle corresponding to the pulses in order to rotate the front group lens frame 24. Thus, the front group lens frame 24 (front group of lenses L1) is moved in the optical axis direction by the helicoid 25 to bring the same to the focusing position.

A cam ring 14 of a lens shutter type of camera according to the present invention has a zooming cam groove 20f in which the front group of lenses L1 is moved forwardly beyond the telephoto-extremity, position as mentioned above. In this macro-photographing mode, when the distance measuring device having a light emitter 3 and a light receiver 4 are actuated, no reflecting light from the object located at the close distance is incident upon the PSD 4a. Namely, no measurement of the object distance can be effected, and accordingly no driving signal (distance data) can be supplied to the shutter block 23. Thus, a device is provided for precisely detecting the object distance, even in the macro-photographing mode.

Figure 30:
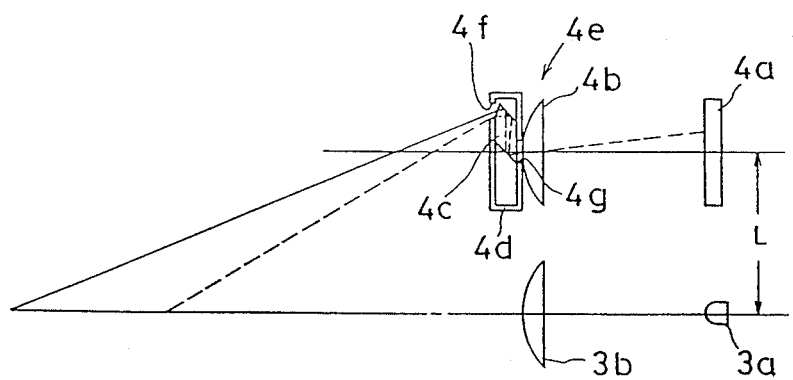

The distance measuring mechanism in the macro-photographing mode will be described below with reference to FIGS. 30 to 32.

A close distance correcting optical element 4e, which has a prism 4c with two total reflecting surfaces and a mask 4d, projects in front of the light receiver 4 of the distance measuring device, only at the macro-photographing mode. The prism 4c optically extends the base length of the distance measuring device and refracts the light. The mask 4d intercepts unnecessary beams of light, and has an opening 4f on the side of the object and an opening 4g on the side of the light receiving lens 4b. The opening 4f is in the form of a slit which is spaced at a distance l far from the optical axis of the light emitting lens 3b, with respect to the optical axis of the light receiving lens 4b. The opening 4g is in the form of a slit corresponding to the optical axis of the light receiving lens 4b.

Figure 31:
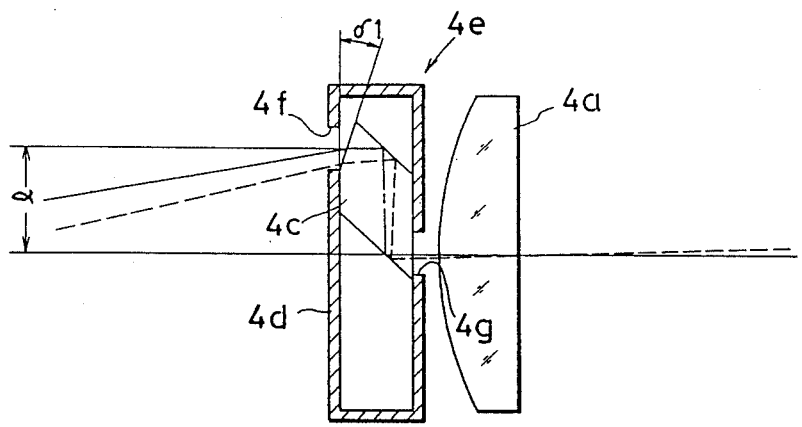
Figure 32:
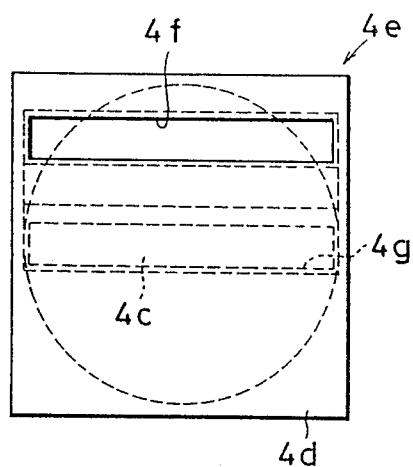

With this arrangement, the prism 4c causes parallel movement of the optical axis of the light receiving lens 4b of the distance measuring device by a distance l in the direction of the base length L, so that the optical axis of the light receiving lens 4b can intersect the optical axis of the light emitting lens 3b within a finite distance, at the macro-photographing mode, as shown in FIG. 31.

According to the arrangement mentioned above, in which not only the refraction of the measuring light but also the parallel movement thereof by the distance l in the direction of the base length L occurs, the increased base length (L+l) increases the displacement of the imaged spot on the PSD 4a with respect to the object distance, so that the object distance can be precisely detected by properly setting the angle δ1 of the prism 4c and the refractive index thereof, etc. Accordingly, when the shutter block 23 is driven in accordance with the distance data thus obtained, focusing can be achieved even at the macro-photographing mode.

The close distance correcting optical element 4e is secured to one end of an arm 42 which is pivoted to the base plate 6 by means of a shaft 41 located below the light receiver 4, as shown in FIGS. 11 to 14. The other end of the arm 42 is provided with an associated projection 43 integral therewith. The arm 42 is flexible so that it is maintained in a linear state when no external force is applied thereto and elastically deforms under an external force applied thereto. The close distance correcting optical element 4e is normally biased to rotate in a direction in which it is retracted from the front portion of the light receiver 4, by means of a tensile spring 46. The cam ring 14 has a projection 44 which comes into engagement with the associated projection 43 when the cam ring 14 comes to the macro-photographing mode, in order to move the close distance correcting optical element 4e in front of the light receiver 4. The shape and the position of the projection 44 are determined so as to rotate the optical element 4e beyond a position in which the optical element 4e comes in front of the light receiver 4. The extremity of the rotation of the optical element 4e by the projection 44 is restricted by the side face of the gear supporting plate 6e integral with the base plate 6, and over-charge by the projection 44 is absorbed by the flexibility of the arm 42.

With the arrangement mentioned above, when the cam ring 14 comes to the macro-photographing position, the close distance correcting optical element 4e can be automatically returned to a position in front of the light receiver 4.

The present invention provides a front conversion adapter 100 which is used with a lens shutter type of camera having a zoom lens, as mentioned above.

FIGS. 1 to 4 show an embodiment of the present invention, in which the front conversion adapter 100 of the present invention magnifies the focal length of 40~60 mm into 60~90 mm (i.e., 1.5 times) in a photographing optical system in which the focal length is varied between 40~60 mm by the front lens group L1 and the rear lens group L2.

The front conversion adapter 100 is detachably attached to a front face of the camera body 101. The front conversion adapter 100 has an adapter body 102 which has a securing seat 103 extending at the bottom thereof, and an upper engagement arm 104. The securing seat 103 and the upper engagement arm 104 are rotatably supported by the body 102 by means of respective shafts 105 and 106 so as to open the seat 103 and the arm 104. The securing seat 103 has a fastening screw 108 which is rotatably supported therein to be screwed in a threaded hole 107 formed in the camera body 100 for a tripod. The engagement arm 104 has a hook 109 which can be engaged onto the upper rear end of the camera body 101.

The body 102 has a cylindrical portion 102a which is located in front of a front cylindrical decoration frame 110 of the camera body 101. The cylindrical portion 102a has therein a lens frame 111 which supports a conversion lens system 112 and which is movable in the optical axis direction. The optical axis of the conversion lens system 112 is identical to the optical axis of the photographing optical system of the camera body 101.

The lens frame 111 has, at its rear end, a magnet 113 attached thereto. On the other hand, the lens frame 22 which is integral with the front lens group L1, and which projects from the cylindrical decoration frame 110, has a magnetic (ferrous) plate 114 corresponding to the magnet 113.

Figure 3A:
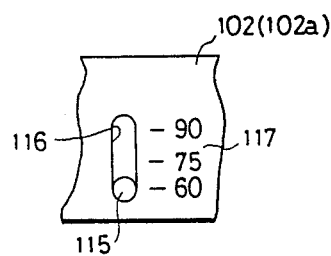
FIGS. 3A and 3B are views viewed along the direction of an arrow III in FIG. 1.

The lens frame 111 is provided, on its periphery, with a focal length indicating pin 115 projecting therefrom, which moves in an elongated hole 116 formed in body 102. As shown in FIG. 3A, the body 102 has marks 117 which indicate the focal length on one side of the elongate hole 116.

The lens frame 111 is provided, on its rear end, with a projection 120 for an object distance signal. The cylindrical decoration frame 110 of the camera body 101 has a signal pin which is pushed by the signal projection 120 of the lens frame 111. When the signal projection 120 pushes the signal pin 121 to detect that the front conversion adapter 100 is attached to the camera body, a correction signal corresponding to the magnification of the conversion lens system 112 is supplied to a control system of a pulse motor of the shutter block (unit) 23 by a pulse correcting means 122.

In the illustrated embodiment, the conversion system 112 is composed of a positive front lens group 123 and a negative rear lens group 124, and compreses a 1.5× tele-conversion lens. Of course, the magnification of the conversion lens system 112 can be below "1" to provide a wide-conversion. Alternatively, the conversion lens system 112, which is comprised of two groups of lenses as mentioned above in the illustrated embodiment, can be replaced with a conversion lens system having more complex and high quality lens groups to eliminate aberrations.

The cylindrical portion 102a has a supporting plate 126 projecting therefrom towards the finder optical system 8, so that a finder correcting lens 128 which is located in front of the finder device 8 is supported by the supporting plate 126. The magnification of the finder correcting lens 128 is identical to that of the conversion lens system 112, and, accordingly, is 1.5× in the illustrated embodiment. The supporting plate 126 has therein an opening window 129 through which light can be transmitted, and which is located to correspond to the light emitter 3.

Figure 1:
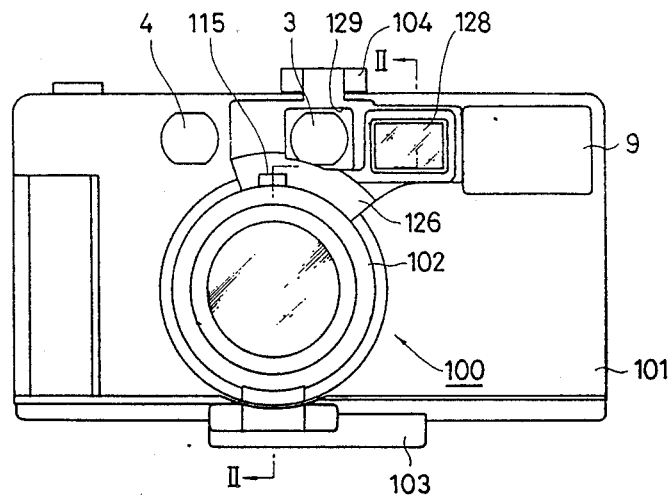
FIG. 1 is a front elevational view of a front conversion adapter according to a first embodiment of the present invention.
Figure 2:
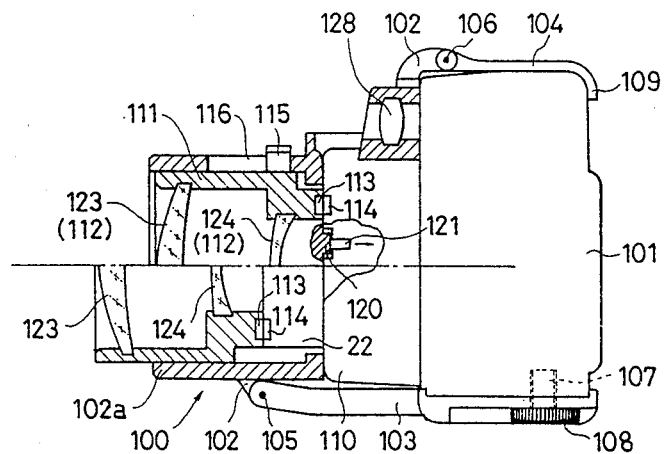
FIG. 2 is a sectional view taken along the line II—II in FIG. 1.

The front conversion adapter 100, as constructed above, is attached to the camera body 101 with the help of the fastening screw 108 of the securing seat 103 and the hook 109 of the engagement arm 104, as shown in FIGS. 1 and 2. In this state of attachment, the lens frame 111 is pushed rearwardly by the focal length indicating pin 115 to attract the magnet 113 to the magnetic plate 114 of the lens frame 22 of the zoom lens system of camera body 101, so that the lens frame 22 and the lens frame 111, and, accordingly, the conversion lens system 112, can be always moved together. As a result, the focal length of the photographing optical system is multiplied times 1.5 by the conversion lens system 112, so that when the zooming operation is effected, the camera body 101, the focal length changes within 60~90 mm in the illustrated embodiment. A user can see the focal length from the relative positional relationship between the focal length indicating pin 115 and the marks 117.

The finder field of view by the finder device 8 is also magnified by 1.5 with the finder correcting lens 128. Therefore, the finder field of view varies in accordance with the magnification of the photographing optical system.

The same is applicable to a case in which the macro-mode is selected on the camera body side. Namely, the focal length at the macro-mode is multiplied by 1.5 by the conversion lens system 112.

Figure 5:
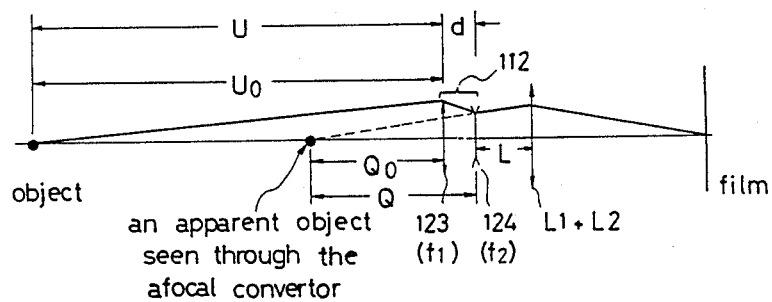
FIG. 5 is a view of a light path showing an apparent position of an object when the front conversion adapter is attached.

Preferably, the conversion lens system 112 is located as close as possible to the photographing optical system (master lens) of the camera body 101. For simplification, an afocal converter consisting of a thin lens having a positive lens 123 and a negative lens 124 will be taken into consideration, in the following discussion, as shown in FIG. 5. Assuming that the focal length of the positive lens 123 is f1, and the focal length of the negative lens 124 is f2 (f2<0), an afocal converter of angular magnification $\gamma$ is obtained when the positive lens 123 and the negative lens 124 are located at a distance $d$ $[d=(\gamma-1/\gamma)f1]$.

When the entrance pupil of the master lens is located at a distance L behind the negative lens 124, the position S of the entrance pupil in the combination of the master lens and the afocal converter is given by the following equation;

$$S = \gamma^2 L + (\gamma - 1)f1$$

On the other hand, the necessary aperture radius r at the tangential plane of the positive lens 123 of the afocal converter is;

$$\begin{aligned} r &= (f_0/2F_{NO})\gamma + (\tan\omega) \times \text{(position of entrance pupil)} \\ &= (f_0/2F_{NO})\gamma + (y/f_0 \cdot \gamma) \times (\gamma^2 L(\gamma - 1)f_1) \end{aligned}$$

wherein
 $F_{NO}$=F number of the master lens,
 $\omega$=angle of view,
 y=height at the image plane; and
 $f_O$=focal length of the master lens An increase of L, which is especially serious in case of a large angle of view of the master lens, requires an increase of the diameter of the conversion lens. Therefore, it is preferable to arrange the master lens and the conversion lens in such a way that the distance therebetween is minimum, as is in the illustrated embodiment. Namely, when the magnet 113 located at the rear end of the lens frame 111 is attracted by the magnetic plate 114 of the lens frame 22 of the zoom lens system of the camera body 101, the distance between the master lens and the negative lens 124 is kept to a minimum.

When the front conversion adapter 100 is attached, the signal pin 121 is pushed by the signal projection 120 to actuate the pulse correcting means 122 incorporated in the camera body 101, so that the driving pulses to be given to the pulse motor of the shutter unit 23 are corrected in accordance with the magnification of the conversion lens system 112. In the above mentioned embodiment, assuming that the an apparent distance when an object is seen through the afocal converter is $Q_O$, and the distance between the object and the positive lens 123 is $U_O$, $Q_O$ is given by the following equation;

$$Q_O = (1/\gamma^2)U_O + [(\gamma-1)/\gamma^2]f1$$

Supposing that the distance between the object and the negative lens 124 is $U(=U_O+d)$, the apparent distance Q between the negative lens 124 and the object is given by the following equation, taking d into consideration;

$$Q = (1/\gamma^2)U + [(\gamma^2-1)/\gamma^3]f1$$

From the above equation, the distance which can be seen through the afocal converter is $1/\gamma^2$, in the area of $U \geq f1$ (usually, f1=several tens of mm, and $U \geq 1000$ mm, with $1 < \gamma < 2$). Consequently, correct focus can be obtained by multiplying, by $\gamma^2$, the driving pulse of the pulse motor of the shutter unit 23 to be produced in response to the distance signal from the object distance measuring device, by the pulse correcting means 122.

When a plurality of front conversion adapters having different magnifications are prepared, a plurality of signal projections 120 and signal pins 121 corresponding to the adapters can be located at different circumferential positions, so that the number of driving pulses can be controlled by the pulse correcting means 122 in accordance with the magnification, in order to effect focusing.

Note that in case of a strobe device 9 having a function for controlling the quantity of light to be emitted, the signal for detecting of the attachment of the front conversion adapter 100 by the signal projection 120 and the signal pin 121 can be used as a signal for changing the quantity of light in accordance with the focal length of the conversion lens system 112. Namely, the guide number of the strobe device can be varied in accordance with the resultant focal length of the photographing optical system.

Figure 6:
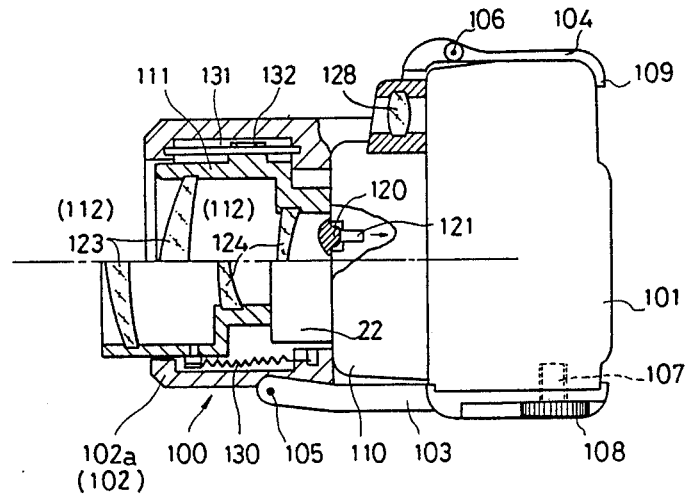
FIG. 6 is a view similar to FIG. 2, but showing another embodiment of the present invention.

FIG. 6 shows a second embodiment of the present invention. In this embodiment, a tensile spring 130 which biases the lens frame 111 towards the camera body 101 is provided between the lens frame 111 and the body 102 to move the master lens and the conversion lens system 112 together. The lens frame 111 is guided to move in the optical axis direction by a plurality of guide poles 131 provided on the cylindrical portion 102a, parallel to the optical axis. Numeral 132 designates projections provided on the lens frame 111 to be engaged by the guide poles 131. Other constructions of the arrangement shown in FIG. 6 are the same as that of the first embodiment.

Figure 3B:
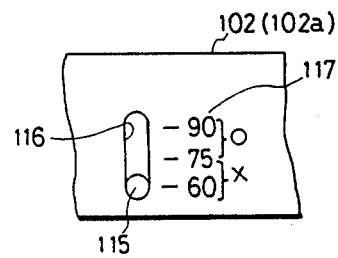
Figure 4:
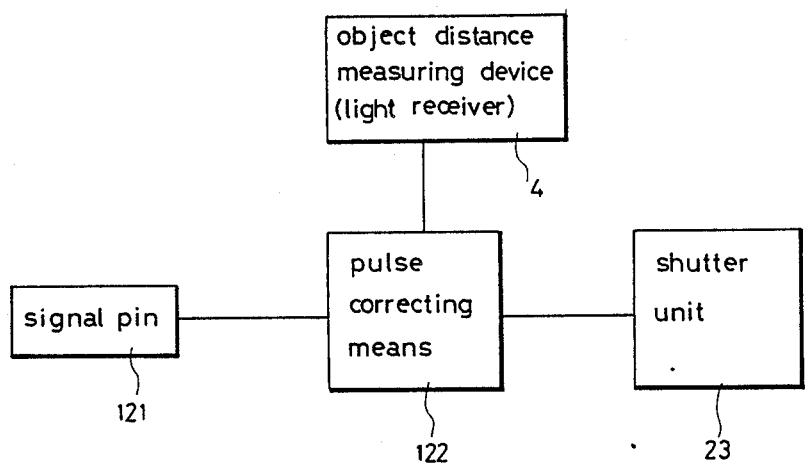
FIG. 4 is a block diagram showing a control system of a pulse motor operated by a detection pin for detecting the attachment of the front conversion adapter.

It is not always necessary for the conversion lens system 112 to be in association with the master lens in all focal length areas of the photographing optical system on the camera body 101. For instance, when the focal length of the camera body side is 40~60 mm, and when the lens frame 22 comes to a position of the focal length of 50 mm, the lens frame 22 comes into engagement with the lens frame 111, and after that, only when the zooming operation is effected to increase that focal length, can the conversion lens system 112 can be actuated. In this alternative, it is preferable to provide means for making the photography impossible or means for warning of the impossibility of photographing before the lens frame 22 on the camera body side comes into abutment with the lens frame 111 of the adapter 100. In FIG. 3B, X and O designate the impossibility of photographing within 60~70 mm and the possibility of photographing within 70~80 mm, respectively.

These warning marks can be provided in the finder. Namely, it is possible to detect the contact between the lens frame 22 of the camera body 101 and the lens frame 111 of the adapter 100 by the signal pin 120 or a similar signal means in order to light a warning indicator, such as LED in the finder, when the adapter is attached to the camera body and when no detection signal is issued.

Figure 7:
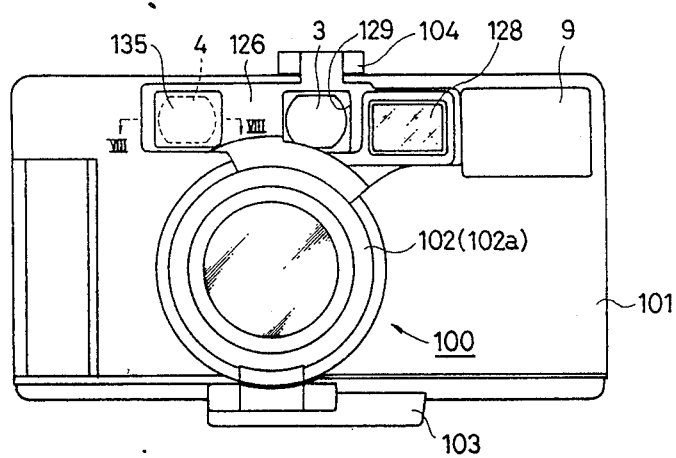
FIG. 7 is a view similar to FIG. 1, but showing a different embodiment of the invention.
Figure 8:
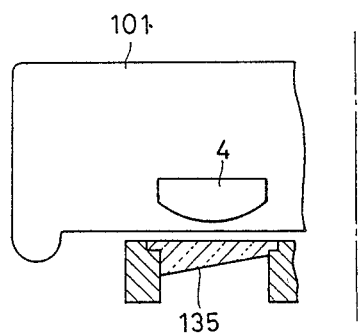
FIG. 8 is a sectional view taken along line VIII—VIII in FIG. 7.

FIGS. 7 and 8 show another embodiment of the invention, in which a light path correcting prism 135 is provided on the supporting plate 126 and in front of the light receiver 4 of the object distance measuring device. In this embodiment, the functions for detecting the attachment of the front adapter, i.e., the signal projection 120 and the signal pin 121, are dispensed with, and in place thereof, the light path correcting prism 135, which is in the form of a wedge having its thickness decreasing toward the photographing optical system, is provided to optically correct the object distance measured by the object distance measuring device. The optical correction of the object distance is equivalent to the modification of the light path of the object distance measuring device, as if an object were at the apparent object distance Q in FIG. 5.

Figure 9:
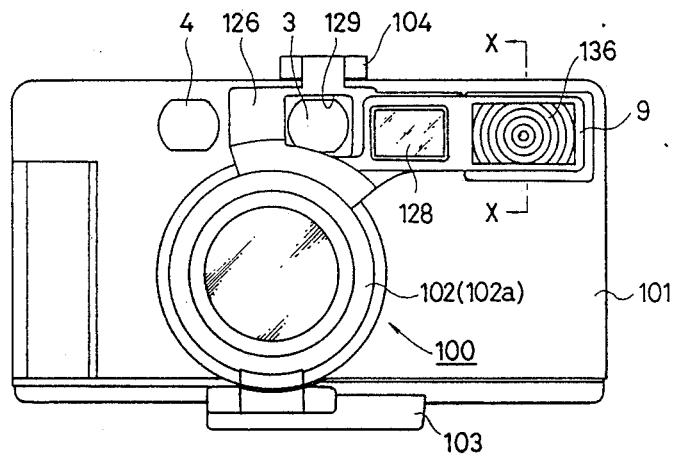
FIG. 9 is a front elevational view similar to FIG. 1, but showing a different embodiment of the invention.
Figure 10:
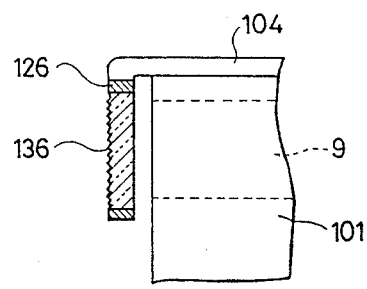
FIG. 10 is a sectional view taken along line X—X in FIG. 9.

FIGS. 9 and 10 show still another embodiment of the present invention, in which a Fresnel lens 136 is located in front of the strobe device 9. The Fresnel lens 136 is a positive lens to condense the strobe light to increase the reaching distance. The focal length of the Fresnel lens 136 is determined in accordance with the focal length of the conversion lens system 112.

Most preferably, the finder correcting lens 128, the light path correcting prism 135 and the Fresnel lens 136 are all located on the supporting plate 126 to correspond to elements provided on the camera body 101. However, since the strobe device 9 is not always used, the provision of the Fresnel lens 136 is optional. Also, the finder correcting lens 128 can be omitted, since the area in which the picture can be taken at the attachement of the front conversion adapter 100 can be indicated, for example, by a bright frame or by a simple mask in the finder device 8.

We claim:

1. A front conversion adapter adapted to be attached to a front face of a lens shutter type of camera having a photographing optical system having a zoom lens, and a finder optical system separate from the photographing optical system, wherein a lens frame of the photographing optical system is adapted to be moved in accordance with the zooming operation, wherein said front conversion adapter comprises an adapter body which can be attached to a camera body of an associated lens shutter type of camera, and a conversion optical system which is located in front of the photographing optical system and which is adapted to move in the optical axis direction of the photographing optical system in order to change the focal length of the photographing optical system, said conversion optical system being supported by an adapter lens frame so as to move in the optical axis direction in association with movement of the lens frame of the photographing optical system of the camera body, and in accordance with said zooming operation in at least a part of the focal length area.

2. A front conversion adapter according to claim 1, wherein said conversion optical system comprises a teleconversion lens for varying the focal length of the photographing optical system towards a long focal length side.

3. A front conversion adapter according to claim 1, wherein said conversion optical system comprises a wide conversion lens for varying the focal length of the photographing optical system towards a short focal length side.

4. A front conversion adapter according to claim 1, further comprising means for detachably attaching the adapter body to said camera body.

5. A front conversion adapter according to claim 4, wherein said means for detachably attaching the adapter body to the camera body comprises a securing seat which extends adjacent to the bottom of the camera body, an engagement arm which extends adjacent to the upper portion of the camera body, and a fastening member on the securing seat.

6. A front conversion adapter according to claim 5, wherein said camera body comprises a threaded hole for a tripod, wherein said fastening member comprises a fastening screw which is adapted to be screw-engaged in the threaded hole of the camera body.

7. A front conversion adapter according to claim 1, further comprising means for connecting the lens frame of the photographing optical system and the adapter lens frame of the conversion optical system together.

8. A front conversion adapter according to claim 7, wherein said means for connecting the lens frame of the photographing optical system and the adapter lens frame of the conversion optical system comprises a magnet provided on one of the lens frames and a magnetic member which is provided on the other lens frame and which is adapted to be attracted by the magnet.

9. A front conversion adapter according to claim 1, wherein said lens frame of the conversion optical system is supported by the adapter body so as to be continuously biased into a position in which it comes close to the lens frame of the photographing optical system, wherein when the adapter lens frame comes into close abutment with the lens frame of the photographing optical system, it is moved by said latter photographing optical system lens frame.

10. A front conversion adapter according to claim 1, further comprising a finder correcting lens which is supported on the adapter body in front of the finder optical system of the camera body and which has a magnification identical to the magnification of the conversion optical system.

11. A front conversion adapter according to claim 1, wherein said camera body has a stepping motor for driving the photographing optical system, and an object distance measuring device which supplies drive pulses for focusing the photographing optical system in accordance with the distance from the object to the stepping motor, wherein said front conversion adapter further comprises means for detecting the attachment of the front conversion adapter to the camera body, and a pulse correcting means for varying driving pulses to be given to the stepping motor from the object distance measuring device in accordance with the angular magnification of the conversion lens system.

12. A front conversion adapter according to claim 11, wherein said detecting means comprises a projection provided on the lens frame of the conversion lens system and a signal pin provided on the lens frame of the camera body which is adapted to be actuated by the projection.

13. A front conversion adapter according to claim 11, wherein said object distance measuring device comprises a light emitter and a light receiver which is adapted to receive light reflected form an object to be photographed, wherein said photographic optical system has a focusing lens which is adapted to be driven in response to the object distance from the object distance measuring device.

14. A front conversion adapter according to claim 13, further comprising a correction prism which is provided on the adapter body, in front of the light receiver, to vary the light path to the object in accordance with the angular magnification of the conversion lens system.

15. A front conversion adapter according to claim 14, wherein said camera body has a strobe device, and wherein said adapter body has a lens which is located in front of the strobe device to change reaching distance of the strobe light in accordance with the angular magnification of the conversion lens system.

16. A front conversion adapter according to claim 15, wherein said lens is a Fresnel lens.

17. A front conversion adapter according to claim 1, further comprising means for indicating the focal length.

18. A front conversion adapter according to claim 17, wherein said indicating means comprises an indicating pin provided on the lens frame of the conversion optical system, and wherein said camera body has a mark which represents the focal length and which corresponds to the indicating pin.

* * * * *

UNITED STATES PATENT AND TRADEMARK OFFICE
CERTIFICATE OF CORRECTION

PATENT NO. : 4,942,414

DATED : July 17, 1990

INVENTOR(S) : Norimichi TAKAHASHI et al.

It is certified that error appears in the above-identified patent and that said Letters Patent is hereby corrected as shown below:

At column 1, line 24, after "disclosed" insert ---in the---.

At column 3, line 34, change "mether mother" to ---mother index---.

At column 3, line 45, delete "; the" after "along".

At column 3, line 54, delete "," after "and".

At column 4, line 29, delete "," after "located".

At column 4, line 50, change "accommodating" to ---ccommodating---.

At column 4, line 54, change "20d" to ---20g---.

At column 5, line 34, delete "," after "end".

At column 6, line 16, delete "to" after "secured".

At column 6, line 23, delete "to" after "53".

At column 6, line 33, delete "L5".

At column 6, line 47, change "69" to ---68---.

At column 6, line 53, change "references" to ---eference---.

At column 6, line 55, delete "," after "section".

At column 6, line 57, delete "," after "03".

At column 7, line 18, delete "," after "78".

At column 7, line 29, change "moves" to ---move---.

At column 7, line 31, change "in the optical path" to ---nto the optical path,---.

At column 8, line 33, delete "," after ---telephoto-xtremity---.

At column 9, line 63, change "100" to ---101---.

At column 10, lines 17/18, change "elongate" to ---longated---.

At column 10, line 22, after "pin" insert ---121---.

At column 10, line 32, change "compreses" to ---omprises---.

UNITED STATES PATENT AND TRADEMARK OFFICE
CERTIFICATE OF CORRECTION

PATENT NO. : 4,942,414

DATED : July 17, 1990

INVENTOR(S) : Norimichi TAKAHASHI et al.

It is certified that error appears in the above-identified patent and that said Letters Patent is hereby corrected as shown below:

At column 10, line 64, change "times 1.5 by" to ---by 1.5 times---.

At column 11, line 45, change "of" to ---in--- before "L".

At column 11, line 63, delete "an" before "apparent".

At column 12, line 28, delete "of" after "detecting".

At column 12, line 58, delete "can" after "112".

At column 13, lines 36/37, change "attachment" to ---attachment---.

Claim 15, line 4, after "change" insert ---the---.

Claim 15, line 5, delete "the" after "strobe".

Signed and Sealed this

Twenty-seventh Day of April, 1993

*Attest:*

MICHAEL K. KIRK

*Attesting Officer*   *Acting Commissioner of Patents and Trademarks*